(No Model.)

W. R. LOCKE.
ADJUSTABLE HARROW, SLED, AND MARKER.

No. 311,903. Patented Feb. 10, 1885.

Witnesses:
Jas. K. McCathran
Geo. H. Rundel

Inventor:—
William R. Locke
by his Att'y.
W. H. Rowe

United States Patent Office.

WILLIAM R. LOCKE, OF NEW RICHMOND, OHIO.

ADJUSTABLE HARROW, SLED, AND MARKER.

SPECIFICATION forming part of Letters Patent No. 311,903, dated February 10, 1885.

Application filed June 2, 1884. (No model.)

*To all whom it may concern:*

Be it known that I, WILLIAM R. LOCKE, a citizen of the United States, residing at New Richmond, in the county of Clermont and State of Ohio, have invented a certain new and Improved Convertible Harrow, Sled, and Marker, of which the following is a specification.

My invention relates to harrows formed of two sections coupled together in such manner that the sections may be turned from a horizontal position to vertical positions and connected together in parallel planes to convert the harrow into a sled or marker.

The object of my invention is, mainly, to provide two frame-sections, each having parallel beams carrying teeth arranged as in a double-A-shaped harrow, one to follow the other, and to adapt this form of a harrow to be readily converted into a sled or marker, as hereinafter described.

Figure 1:
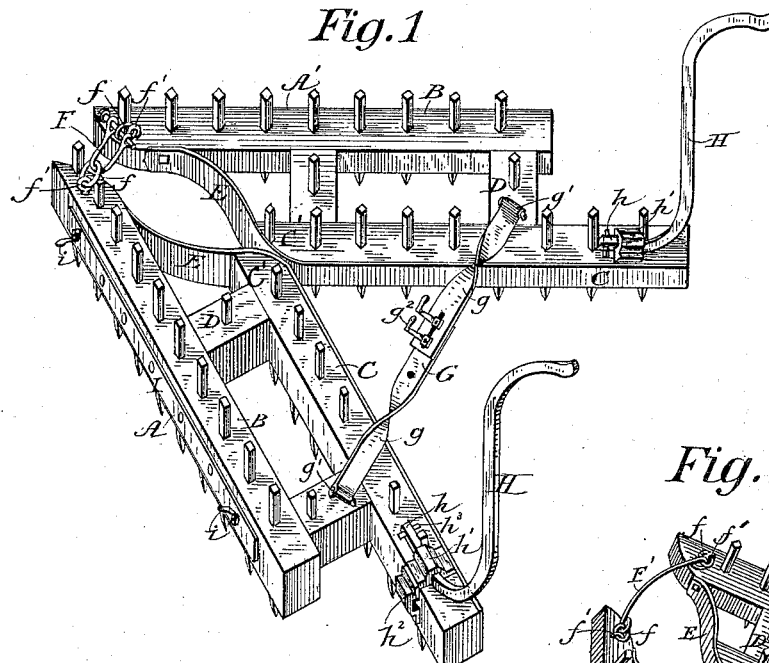
Figure 2:
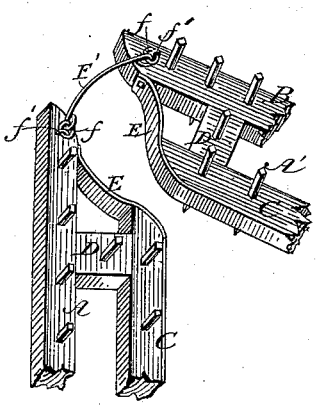

In the accompanying drawings, Figure 1 is a perspective view of the implement when ready for use as a harrow; Fig. 2, a similar view of a fragmentary part of the implement, showing the forward ends of the sections spread apart for harrowing on both sides of a row of plants; and Fig. 3, a perspective view of the implement arranged for use as a sled or marker.

The implement is made in two sections, A A', each of which are formed of two parallel beams, B C, of about equal length, secured together by cross-pieces D D, and are arranged in such manner that one end of each of the beams will project beyond the corresponding end of the other beam. A metal plate, E, extends from the end of the forwardly-projecting beam B in a curved form around the inner side of the rearwardly-projecting beam C, and forms a strong brace when used as a harrow, and a durable runner when used as a sled. The sections A A' are coupled together at their forward ends by a clevis, F, rings $f\ f$, and eyebolts $f'\ f'$, secured to the ends of the outer beams, B, and are connected at their rear ends by an adjustable coupler-bar, G. The bar G is formed in two parts, $g\ g$, each of which is hinged to a staple, $g'$, secured to the rear crosspiece, D, and are arranged to overlap each other and be firmly bolted together by crank-nuts and clamping-bolts $g^2$, which are fitted in holes or slots in the overlapping ends of the parts $g$, by which means a sure and convenient adjustment is secured. The location of the staples $g'$ upon the upper side of the cross-pieces D and their hinged connection to bar G will admit of the main sections A A' being swung out into a vertical position to convert the harrow into a sled, or vice versa, without removing the bar G from its connections. Handles H, provided with squared shanks $h\ h$ at their lower ends, are fitted snugly in corresponding socket-plates, $h'\ h^2$, secured upon the adjacent sides and rear ends of the rearwardly-projecting beams C, and said handles may be interchangeably placed in either of the socket-plates to adapt the handles to be used upon the sections when arranged either as a harrow or as a sled and marker. A small pin or key, $h^3$, may be employed to secure the handles in their sockets. The beams B and C are both provided with harrow-teeth arranged in parallel converging rows arranged to follow each other, and the cross-pieces D may be similarly provided with teeth, to provide ample means for thoroughly breaking up and pulverizing the soil.

When the harrow is to be converted into a sled and marker the clevis F is removed, the handles are transferred to the position parallel with each other, a cross-brace, I, is then secured by bolts and crank-nuts $i\ i$ to the upper and forwardly-projecting ends of the beams B, and the transformation to a sled and marker is completed.

Bolt-holes $i$ in the ends of the brace I and similar holes in the overlapping ends of the bar G permit the adjustment of the runners toward or from each other to be regulated by or conform to the width of the row to be marked.

The cross-brace I may be provided with a hook, I', to connect it with the draft attachments, and hooks I² may be employed to form corner-braces between the bar I and the beams B. When the sections A A' are placed in position to form a harrow, the bar I' is disconnected at one end, swung around upon the other locking-bolt, and placed in position closely against the outer side of one of the beams B, and securely bolted in that position to be conveniently carried and always ready for use. The projection of the forward ends of the beams B above and beyond the corresponding ends of the beams C allows the sections A A' to be coupled together in a double-A-shaped form, as shown in Fig. 1, so that while their extreme forward ends are secured together by the clevis F the forward rounded ends C' of the beams C may abut against each other to steady the structure and form a shoulder-bearing or fulcrum-point for tightening the sections A A' by means of the adjustable bar G, above described. The forwardly-projecting upper beam, B, when used as a sled, provides convenient means for connecting the draft attachments, and enables the runners to ride freely over obstacles, and the rearwardly projecting beams C provide suitable and convenient means for connecting the handles to the sections when used in either position.

Figure 3:
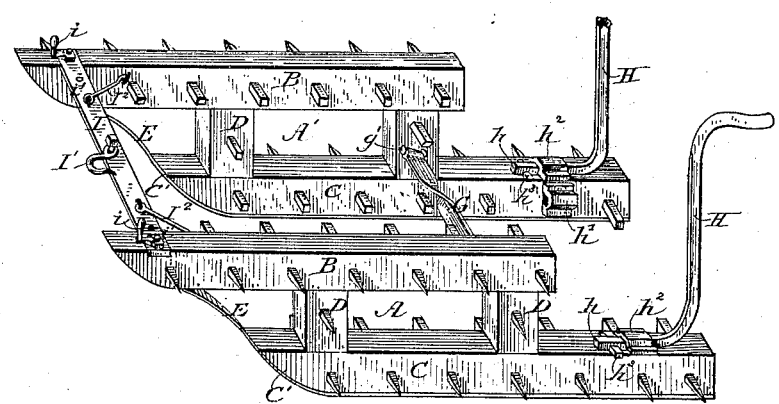

When the forward ends of the sections A A' are coupled together by a rigid link, F', as shown in Fig. 3, and the rear ends of said sections are properly adjusted by means of the bar G, the harrow may be used to straddle a row of vegetation, and any required adjustment may be made to suit the spaces between the rows or adapt the implement to the character of the soil or the nature of the work. The handles permit the sled or harrow to be guided and directed in its course, to avoid obstacles, and be held in the path of the team.

I am aware that convertible harrows and sleds or markers have heretofore been employed, and that combined harrows and sleds have been constructed with beams which project forwardly and rearwardly of each other.

I claim as my invention and desire to secure by Letters Patent—

1. The convertible harrow, sled, and marker composed of two frame-sections formed of parallel beams B C, united by cross-pieces D D, and shod with the forwardly-curved plate E, which serves both as a fulcrum and runner, and provides an intermediate bearing-shoulder, C', in combination with adjustable linked connections for uniting the frame-sections, substantially as described, and for the purpose specified.

2. In a combined harrow and sled or marker, the combination of the parallel beams B C, united by cross-pieces D, the beam B, arranged to project beyond the beam C at its forward end, and the beam C, arranged to project beyond the beam B at its rear end, coupling bars or links adapted to be arranged either in the form of a double-A harrow or a sled and marker, the removable handles H, and sockets $h'$ $h^2$, arranged, respectively, upon the adjacent sides of the rearwardly-projecting ends of the beams C, substantially as described.

In testimony whereof I have hereunto subscribed my name.

WILLIAM R. LOCKE.

In presence of—
LUCIAN M. DAWSON,
LEPOLD G. GRASON,
BENJAMIN L. WINANS.